United States Patent [19]

Falgiatore et al.

[11] 4,279,959

[45] Jul. 21, 1981

[54] WATER-INSOLUBLE COPOLYMERS CONTAINING AMIDE-POLYALDEHYDE THERMOSETTABLE SYSTEM

[75] Inventors: Dominic R. Falgiatore, Philadelphia; William D. Emmons, Huntingdon Valley, both of Pa.

[73] Assignee: Rohm and Haas Company, Philadelphia, Pa.

[21] Appl. No.: 108,104

[22] Filed: Dec. 28, 1979

Related U.S. Application Data

[62] Division of Ser. No. 848,258, Nov. 3, 1977, Pat. No. 4,199,643.

[51] Int. Cl.³ .................... D04H 1/58; B32B 27/00; B05D 3/02; D06M 13/34
[52] U.S. Cl. .................................... 428/288; 8/127.6; 8/184; 8/185; 260/29.4 UA; 427/389; 427/391; 427/392; 428/290; 428/530; 525/509; 525/515; 528/245
[58] Field of Search ............ 8/115.6, 184, 185, 127.6; 204/159.21; 427/389, 391, 392; 428/290, 288, 530; 260/29.4 UA; 525/509, 515, ; 528/245

[56] References Cited

U.S. PATENT DOCUMENTS

| | | | |
|---|---|---|---|
| 3,100,674 | 8/1963 | Steiger et al. | 8/127.6 |
| 3,157,562 | 11/1964 | Kine et al. | 427/389 |
| 3,709,857 | 1/1973 | Faessinger | 162/167 |
| 3,840,489 | 10/1974 | Strazdins | 260/29.6 TA |

*Primary Examiner*—Michael R. Lusignan
*Attorney, Agent, or Firm*—Harold L. Greenwald

[57] ABSTRACT

Disclosed is a water-insoluble addition copolymer of an ethylenically unsaturated unsubstituted amide and at least one other ethylenically unsaturated monomer comprising sufficient amide groups mono-functionally bonded to a polyaldehyde to render the copolymer thermosettable. The copolymer is adapted for use as or for formulation in a binder. Such a binder is readily made from a copolymer latex and is useful in processes for the preparation of products such as nonwoven fabrics and bonded papers.

19 Claims, No Drawings

WATER-INSOLUBLE COPOLYMERS CONTAINING AMIDE-POLYALDEHYDE THERMOSETTABLE SYSTEM

This is a division of application Ser. No. 848,258 filed Nov. 3, 1977, now U.S. Pat. No. 4,199,643, patented Apr. 22, 1980.

BACKGROUND OF THE INVENTION

The present invention is concerned with water-insoluble addition copolymers of ethylenically unsaturated amides and other ethylenically unsaturated monomers in which sufficient amide groups are mono-functionally bonded to a polyaldehyde to render the copolymer thermosettable. The copolymer is readily made in the form of a copolymer latex and is useful in processes for the treatment of textile substrates, such as in binders for nonwoven fabrics and hand or softness modifiers, and in the preparation of papers utilizing binders or coatings.

It is known in the art to employ water-insoluble aldehyde-substituted amide copolymers, in which the aldehyde is a mono-aldehyde, such as formaldehyde, as a binder. Christenson, U.S. Pat. No. 3,037,963, teaches the preparation of mono-aldehyde-substituted amide copolymers, particularly those in which the amide copolymer is a copolymer of acrylamide and the aldehyde is formaldehyde. Kine, et al., in U.S. Pat. No. 3,157,562, teach that certain linear addition copolymers containing N-methylolamide groups and amide groups, in certain proportions, serve as binders for nonwoven fabrics. Steiger et al., in U.S. Pat. No. 3,100,674, teach the use of N-methylolamide copolymers for the stabilization against shrinkage of protein-containing woven and knitted textile materials. In discussing the usable aldehydes, Christenson (U.S. Pat. No. 3,037,963 column 7, line 6) comments "Aldehydes containing two or more aldehyde groups, such as glyoxal, are unsatisfactory and should not be used inasmuch as they cause gel formation when reacted with amide interpolymers." Talet, U.S. Pat. No. 2,886,557, reacts glyoxal with an acrylamide copolymer to produce a crosslinked polymer. We have discovered how to prepare water-insoluble amide copolymers coreacted with polyaldehydes without forming a crosslinked polymer gel. Thus this polymer is useable as a thermosettable binder or treating agent in textile and paper technology. The thermosettable polymer is useful as a self-crosslinking system or, if desired, with external crosslinkers.

Self-crosslinking polymer systems are particularly useful as adhesives in soft fiber fabrics, as the bonding agent to bond a laminate foam to a fabric or a fabric to another fabric, as the bonding agent in nonwoven fabrics, as a fabric backing agent, as a pigment binder especially for use on paper and to bind pigments to glass fabrics, as a pigment binder particularly in pigment printing and dyeing of fabrics, as a fabric finishing agent to modify the hand or weight of a fabric, as a finish for breatheable waterproof colored fabric, as a stabilizer for woolen and worsted fabrics and as a binder for papers. The self-crosslinking nature of the system produces, upon appropriate curing, products with excellent durability to washing and dry cleaning. The addition of external crosslinking agents is not necessary to produce the appropriate crosslinking although in certain instances it is found useful.

Exposure of workers to formaldehyde has been of growing concern to industry and to regulatory agencies responsible for worker safety. The various formaldehyde amide adducts, such as polymers containing methylolacrylamide, urea formaldehyde resins or crosslinkers and melamine formaldehyde resins or crosslinkers, produce free formaldehyde during curing operations and during storage periods, both before and after curing. One of the purposes of this invention is to replace these binder systems, which produce the toxic formaldehyde particularly during manufacture, by a binder system which is handleable in manufacturing facilities without the necessity for extreme safety precautions. Fabrics utilizing formaldehyde-containing polymers are often found to be irritants, especially when used in contact with sensitive tissues, so a replacement polymer, such as that of the instant invention, is needed.

BRIEF SUMMARY OF THE INVENTION

This invention relates to a polymer composition comprising a water-insoluble addition copolymer of (A) a monomer which is the product of an ethylenically unsaturated unsubstituted amide monomer condensed with one aldehyde group of a polyaldehyde, the product having at least one free aldehyde group, and (B) at least one other ethylenically unsaturated monomer; the amide monomer component of (A) and any unsubstituted amide monomer of (B) being up to 50% of the total monomers, by weight. In a preferred embodiment, the copolymer has sufficient unsubstituted amide groups among the (B) monomers and amide groups mono-functionally bonded to a polyaldehyde, (A), to be thermosettable. In another embodiment, an external crosslinker is used in the binder composition. The invention also relates to processes for producing the polymer and for using the polymer in the manufacture of fabrics and papers. A preferred state in which the polymer is manufacture and used is as a stable polymer latex or polymer emulsion.

The most important of the other ethylenically unsaturated monomers, other than the amides, are: (1) vinyl esters of an aliphatic acid having 1 to 18 carbon atoms, especially vinyl acetate; (2) acrylic acid esters and methacrylic acid esters of an alcohol having 1 to 18 carbon atoms, and (3) ethylenically unsaturated hydrocarbons such as ethylene, propylene, isobutylene, styrene, alphamethyl styrene and aliphatic dienes such as butadiene, isoprene and chloroprene.

The ethylenically unsaturated amide of utility in copolymer components (A) and (B) is a polymerizable amide such as acrylamide, methacrylamide and itaconic half ester amide and diamide. Glyoxal is an example of the polyaldehyde which is mono-functionally bonded to an amide group to give the following structure:

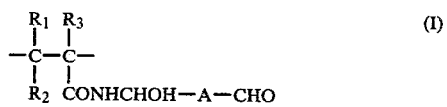

wherein $R_1$, $R_2$ and $R_3$ are independently, hydrogen, a mono-functional organic group or two of them together are a di-functional organic group and A is a single bond, as in glyoxal, or a di-functional organic group. Thus the polymer is a polyaldehyde-modified, amide-containing, addition copolymer which is used in the manufacture or processing of fabrics or papers. The fabrics produced have sufficient resistance to washing and dry cleaning for most practical purposes even without the employment of an external crosslinker, such as an aminoplast or a polyepoxide in conjunction with the polyaldehyde-modified, amide-containing polymer. The amide-containing polymers, when cured as by heating at an elevated temperature, impart resistance to normal laundering operations, such as may be performed with modern detergents, as well as resistance to dry cleaning, which may be performed by chlorinated hydrocarbons.

The copolymers of the present invention are water-insoluble linear addition copolymers preferably prepared by emulsion copolymerization. The copolymers are prepared using up to 50 percent of amide monomers and the remainder other ethylenically unsaturated monomers. Amide groups of the polymer are predominantly condensed with one aldehyde group of a polyaldehyde, as indicated by the absence of gelation, and there remain free aldehyde groups on the polyaldehyde, as shown by the curability of the polymer. Thus the polymer comprises unreacted aldehyde groups and in the self-curing embodiment, unreacted amide groups. In a preferred embodiment, the polymer also comprises acid groups.

The preferred polymers of this invention are those in which the polyaldehyde is glyoxal. A preferred method for preparing the polymers is by emulsion polymerization of the monomers in the presence of the polyaldehyde, under conditions such that the reaction of the polyaldehyde and the amide occurs, in a one step process producing a polymer which is still thermosettable. The thermosettable nature of the product indicates that there are unreacted aldehyde groups available for crosslinking to other groups reactable with the aldehyde such as other amide groups. The latex so produced is used in the manufacture of paper or fabric products following the art-known procedures used for monoaldehyde-amide containing copolymers. Of course, those skilled in the art will make the necessary accommodations for modest differences in reaction rates between the monoaldehydes formerly employed and the polyaldehyde-amide of the present invention. The fabric or paper containing the polymer is cured at an elevated temperature for a suitable length of time. The cured material is water resistant and solvent resistant. It is hypothecized that the improvement in both strength and resistance properties obtained on curing is due to further coreaction of the aldehyde and amide groups which had been pendant on the polymer to produce a crosslinked polymer.

DETAILED DESCRIPTION

The polymer composition of this invention is preferably prepared in latex form as a water-insoluble addition copolymer of an ethylenically unsaturated amide and at least one other ethylenically unsaturated monomer. Preferably, the polymerization is carried out in the presence of a polyaldehyde which bonds to the polymer via the amide groups on the polymer so as to render the copolymer thermosettable. The copolymer is little, if any, crosslinked by the polyaldehyde during the polymerization. It is believed that the polyaldehyde is preponderantly mono-functionally bonded to the copolymer. Thus the copolymer is not crosslinked but is still crosslinkable at the end of the polymerization step. Although there are unreacted aldehyde groups in the polymer, the latex is stable and does not gel when stored at room temperature for months or even longer. The produced latex, in a formulation if desired, is applied to the appropriate substrate and the polymer is crosslinked, by curing via heating, using art-known steps for the given use.

It is preferred that the polyaldehyde be at least slightly water soluble such as gluteraldehyde or 2-imidazolidone-1,3-bis(2,2-dimethylpropanol) or more preferably, water soluble such as glyoxal. By polyaldehyde, what is meant in this specification is a non-polymeric organic molecule with more than one

group. Aldehydes often form homopolymers or copolymers with water that are not the polyaldehydes referred to in this specification. The preferred polyaldehyde of this invention is glyoxal, ordinarily depicted by the structure

Glyoxal is most commonly available commercially as a 40% aqueous solution. In this form glyoxal has no appreciable vapor pressure and is not, under atmospheric or vacuum stripping conditions, distillable from water. Aqueous solutions of glyoxal are nonexplosive and nonflammable. Glyoxal in its hydrated form (II) is believed to exist in equilibrium with (IIa) and (IIb):

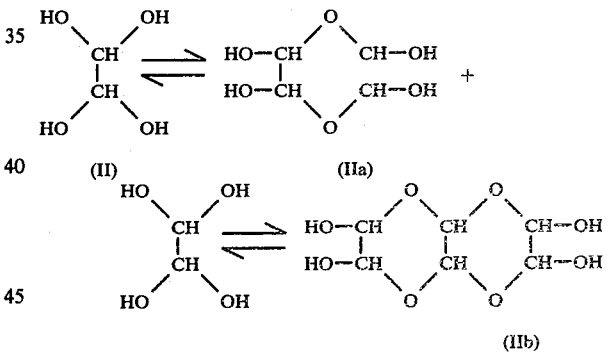

In the discussion of molar ratios with respect to amides, the simplified OHC—CHO depiction is used in this specification.

The ethylenically unsaturated unsubstituted amide monomers of this invention include acrylamide, methacrylamide, itaconic diamide, crotonamide, acryloxypropionamide, maleic, fumaric and itaconic half amides and so forth. The preferred amides are methacrylamide and especially acrylamide. An unsubstituted amide is an amide having two hydrogens on the amide nitrogen, i.e. the amide group —CONH$_2$.

Among the other ethylenically unsaturated monomers useful in this invention are the vinyl esters of an aliphatic acid having 1 to 8 carbon atoms such as vinyl formate, vinyl acetate, vinyl propionate, vinyl butyrate, and vinyl versitate. Preferred is vinyl acetate particularly when used with one or more of the following: vinyl chloride, vinylidene chloride, styrene, vinyl toluene, acrylonitrile, methacrylonitrile, and acrylate or methacrylate esters. The acrylate and methacrylate esters of alkyl and cycloalkyl alcohols having 1 to 18 carbon atoms form useful polymers, with $C_1$ to $C_8$ alcohols being preferred, particularly mixtures of these and also in mixtures with the following monomers: vinyl acetate, vinyl chloride, vinylidene chloride, styrene, α-methyl styrene, vinyl toluene, acrylonitrile and methacrylonitrile. The unsaturated hydrocarbons, such as ethylene, isobutylene and styrene are particularly useful when used in conjunction with one or more esters, nitriles or amides of acrylic acid or of methacrylic acid or with vinyl esters, vinyl chloride or vinylidene chloride. In all of these systems, it is quite common and indeed useful to include a small amount such as a ½ percent to about 2½ percent, 4%, or perhaps 8% or more, of an ethylenically unsaturated carboxylic acid monomer in the monomer mixture used for making the copolymers. Acids used include acrylic, methacrylic, itaconic, aconitic, citraconic, crotonic, maleic, fumaric the dimer of methacrylic acid and so forth. The use of the acids often aids in the curing of the polymer. Esters of these acids with $C_1$ to $C_{18}$ alcohols may be used. The preferred esters of methacrylic acid in these copolymers are methyl, ethyl, propyl and butyl with methyl being most preferred. The preferred esters of acrylic acid are the methyl, ethyl, n-propyl, isopropyl, n-butyl, secondary butyl, isobutyl and 2-ethylhexyl esters. A copolymer composition containing at least about 60% by weight of esters of acrylic or methacrylic acid or a mixture of these is especially useful.

The preferred copolymers of the present invention are water-insoluble, linear addition copolymers obtained by emulsion copolymerization of unsubstituted amide monomers with other monomers; the copolymerization being carried out in the presence of a polyaldehyde. The upper limit of the concentration of amide monomer is determined by the solubility of the copolymer formed; there is to be less amide monomer than the amount sufficient to render the copolymer water soluble. Although 50% or 25% may be employed, it is found that 12% by weight of amide monomer, on copolymer, normally suffices and 0.5% is a usual lower limit for effective crosslinking. Preferably, the amide monomer content is between 2% and 10% with 3% to 6% being most preferred. These amide monomer composition limits are calculated on the basis of the amide monomer ingredients before condensation with a polyaldehyde.

In a self-crosslinking embodiment of this invention the amount of polyaldehyde used is such that there is sufficient to give effective crosslinking but not so much in relation to the amount of amide present that substantially all of the amide groups are reacted with polyaldehyde during the polymerization. These desiderata are achieved when there are about 0.2 to about 0.8 of a mole of polyaldehyde per mole of amide groups. Thus, when the latex is prepared and applied to the fabric or paper for the curing or second stage reaction if there is 0.2 mole of polyaldehyde per mole of amide there is 0.8 mole of amide groups available for the crosslinking reaction. At the other extreme, when 0.8 mole of polyaldehyde per mole of amide groups is incorporated during the polymerization, than 0.2 mole of amide groups are available for the crosslinking reaction during curing. Preferably, there is between 0.4 and 0.6 mole of polyaldehyde per mole of amide groups with 0.45 to 0.55 mole of polyaldehyde per mole of amide groups being most preferred.

In another embodiment of this invention, 0.5, preferably 0.7 to one mole of polyaldehyde per amide group is present during the polymerization. In this embodiment, crosslinking is achieved by use of an external aminoplast crosslinking agent such as a polyamide or a compound containing amide-like $NH_2$ groups, such as urea and melamine, or aldehyde-substituted amide groups including dihydroxy ethylene urea. This includes the aldehyde and alcohol/aldehyde adducts of urea and melamine. Use of the formaldehyde adducts would defeat the purpose of the invention so formaldehyde-free aminoplasts are preferred. Among the preferred polyamides which can be employed are those of oxalic, malonic, adipic, pinelic, suberic, azelaic, sebacic, isophthalic, terephthalic and the like acids. Also, there may be employed the amides of dimer and trimer acids and mixtures thereof; these acids are prepared by the polymerization of $C_{18}$ fatty acids. The external crosslinking agent is used in an amount up to about 25% of the copolymer, up to 11% being preferred, and up to 7% being most preferred. Formulations in which the polyaldehyde to amide ratio is high usefully embody 0.5% or more, preferably over 2% of external crosslinker.

The glass transition temperature of the copolymer, before curing, is below 35° C., preferably below 20° C. and most preferably below 0° C. The weight average molecular weight of the polymer, aside from any small amounts which may be gelled, is preferably between 100,000 and 10,000,000 with 300,000 to 3,000,000 being preferred.

A polyaldehyde, such as glyoxal, admixed but not coreacted with an amide copolymer, such as a copolymer of acrylamide or methacrylamide, may be applied to a substrate and cured to produce a fabric or paper. The fabric or paper so produced is found to be less resistant to water, laundering and dry cleaning than fabric or paper employing the copolymers of this invention, other conditions being the same. In general, high proportions of the crosslinking moieties taken together, that is, of amide and aldehyde, tend to give products which are excessively stiff. Of course, in certain applications, the stiffness is desirable. Low levels of amide or aldehyde lead to a loss of the resistance properties.

An especially useful polymer is a copolymer of, by weight, 20 to 96% ethyl acrylate, 0 to 96% propyl or butyl acrylate or a mixture thereof, 0 to 25% acrylonitrile, 0 to 50% methyl methacrylate, 3 to 6% acrylamide, 0 to 2% itaconic acid and 1 to 2% glyoxal. More preferred is a copolymer which consists consists of 70 to 92.5 ethyl acrylate, 3 to 5% acrylonitrile, 0 to 25% butyl acrylate, 0 to 10% methyl methacrylate, 3 to 4% acrylamide, and 0.5 to 1.5% itaconic acid and 1 to 2% glyoxal, by weight.

The preferred copolymerization process is a conventional emulsion polymerization procedure with certain modifications. "Emulsion Polymerization" is taught in books, so titled, by D. C. Blackley (Wiley, 1975) and by F. A. Bovey et al. (Interscience Publishers, 1965). The coreaction of the aldehydes (mono-functionally) with the amide during the polymerization is favored by using a thermal polymerization process, the presence of all of the aldehyde in the kettle charge at the beginning of the polymerization or prior to the polymerization and the presence of part of the amide in the kettle prior to the polymerization. It is preferred that at least one third and more preferable that at least two thirds of the total aldehyde and that up to 25%, preferably 17% and more preferably 10%, of the total amide monomer be in the kettle charge. The aldehyde-amide reaction need not be completed before the polymerization is begun thus the polymerization is carried out in the presence of any remaining polyaldehyde and of a free radical initiator. At the end of the polymerization substantially all of the glyoxal in the latex is bonded to the copolymer. The emulsion polymerization procedures may employ a suitable emulsifier, preferably an anionic emulsifier and a free radical initiator which may, if desired, although it is not the preferable system, be a component of any of the well known redox initiator systems. Preferred emulsifiers are sulfates and sulfonates such as sodium lauryl sulfate, and sodium dodecyl benzene sulfonate. Many others are well known in the emulsion polymerization art. The amount of emulsifier is usually between ½% and 6% on the weight of monomers with 1% to 3% being preferred. From 0.1% to about 2% on the weight of monomers of free radical iniator such as azodiisobutyronitrile, t-butylhydroxyperoxide, ammonium, sodium or potassium persulfate may be employed. Suitable chaser systems are employed to result in a polymer system essentially free of formaldehyde, amide monomer and polyaldehyde. The polymerization process may be one which produces graft or block copolymers wherein one or more but not all of the monomers are first polymerized and then one or more other monomers are copolymerized with the first polymer obtained.

The latex is usually at an acid pH as manufactured, typical values being in the pH range from two to three. Formulation of the latex for a given application may shift the pH, for example incorporation of an acid catalyst usually lowers the pH somewhat, a drop of about a half unit is often found. In preferred formulations the system is stable at room temperature including formulations containing acid catalysts.

A preferred use of the binders of the present invention is to bind nonwoven webs to form nonwoven fabrics. The selection of fibers and the description of the application of a binder is given in U.S. Pat. No. 3,157,562, column 3, line 30 to column 4, line 53, herein incorporated by reference.

Although it is not intended to limit the invention by any theory or theoretical structure herein presented, certain concepts are presented as aids in teaching the invention. It is believed that during the formation of the polymer, the polyaldehyde reacts with amide groups on the monomer or on the polymer by means of one amide group reacting with one aldehyde group. This reaction occurs before, and/or contemporaneous with, the vinyl polymerization reaction which forms the polymer. In some instances the aldehyde-amide reaction occurs, in the polymerization vessel, subsequent to the polymerization. Using as typical an acrylamide unit in the polymer and glyoxal as the aldehyde, the resulting unit in the aldehyde polymer adduct has the theoretical formula (III).

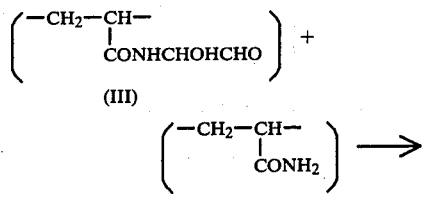

-continued

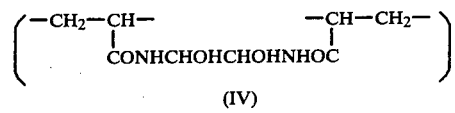

During curing in a self-crosslinking embodiment of this invention, the reaction depicted to form crosslinked structure (IV) occurs. In a typical embodiment employing an external crosslinker, in this instance urea, the following reaction is thought to occur, producing crosslinking by means of structure (V):

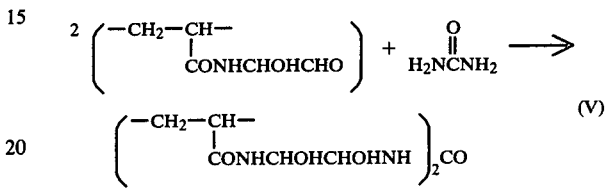

In the self-crosslinking reaction, a dependent aldehyde group of one polymer molecule reacts with an amide group of another polymer molecule to give the crosslinked structure believed to be depicted by structure (IV). In the case of the external crosslinker, again two polymer molecules are joined this time via an external crosslinker molecule, such as urea, with the crosslinked structure being depicted as in structure (V). The aldehyde may react with other types of groups containing reactive hydrogen, the groups being those of others of the polymer molecules or of other crosslinking molecules. There may also be some reaction, during curing, between the aldehyde groups of the polymer molecules and reactive groups in the fibers of the paper or fabric, such as the hydroxyl groups of the cellulose fibers. While the precise nature of the reaction and the products thereby obtained are not clearly understood, it is believed that the resistance to laundering and dry cleaning is the result of a reaction between binder polymer molecules to crosslink these molecules and/or a reaction between the binder polymer molecules and the reactive sites of the fiber molecules.

The polymers of this invention are crosslinked by a curing step which may either be simultaneous with or following the drying of the polymer on the substrate. The curing may be by long subjection to the normal atmosphere in high temperature climates or by heating the articles coated or impregnated with the polymer described herein to a temperature of 80° C. to about 400° C. or higher for periods of time from a few seconds at the higher temperatures up to an hour or more at the lower temperatures. Temperatures below 80° C. may be employed if somewhat longer times are used. Typical schedules for air dried systems are about 15 seconds to about 15 minutes at temperatures in the neighborhood of 150° C. The polymer of this invention may be used in combination with other polymers commonly employed in bonding or treating fabrics and paper.

Although catalysts are not necessary to obtain the crosslinking desired in the cure step, they may be used. Acid catalysts, well known in the art, may be employed at levels up to 1% with 0.1% to 0.5% being preferred. Higher levels of catalysts often, but not always, produce undesirable side effects. Examples of acid catalysts are oxalic acid, boron trifluoride ethyl etherate, salts of hydrochloric acid such as the zinc or magnesium salts, salts of nitric acid such as the zinc or magnesium salts, maleic acid, p-toluene sulfonic acid, butyl acid phosphate and so forth.

The compositions of the present invention may be formulated with pigments, dyes, thickening agents and other conventional components needed to achieve the properties desired for the given end use. For instance, aqueous dispersions of these polymers may contain water-soluble thickening agents such as tragacanth, water-soluble cellulose ethers, polyvinyl alcohol or partially saponified polyvinyl acetate or polymers or copolymers of acrylic or methacrylic acid soluble in water. The proportions of the ingredients in the aqueous systems may be varied widely and are adjusted in any convenient manner so that the dispersion or paste have a consistency suitable for the application by the particular technique to be used for this purpose.

The drying referred to above may be air drying by simple exposure to the ambient atmosphere or it may be force drying of the coated or impregnated material at temperatures below 80° C. As noted, the air drying or force drying may itself produce a cured product without the need of a subsequent curing step. Of course, usually a cure step is desired. The upper limit of temperature and its duration in the curing step should be so selected and correlated as to avoid decomposition or other damage to the coated or impregnated article. The curing operation serves to render the polymer insoluble in organic liquids as well as water.

The compositions may be applied to the substrates in any suitable manner such as by spraying, brushing, roller-coating dipping, knife-coating, and so on. Excess of the applied material may be wiped by any suitable squeegeeing operation such as between pressure rollers, by air squeegeeing, or by a knife or doctor blade. Thereafter, the coating may be dried and cured as stated hereinabove. Besides simple air-drying, there may be employed for this purpose heated air as in an oven or tunnel drier, radiation such as by infrared lamps, or electrical induction, either of electromagnetic or electrostatic high frequency induction fields. The baking or curing operation may be accomplished by the use of any suitable heating devices such as infrared lamps or electromagnetic or electrostatic high frequency induction devices.

When the coating compositions are applied to substrates having reactive groups, such as paper or textiles formed of cellulosic or proteinaceous fibers, it is believed that the substrate may take part in the reaction during curing and baking so that the copolymer and the substrate are combined chemically, whereby outstanding adhesion, durability, and resistance to water, washing, laundering, and solvents, including those used for dry-cleaning, such as perchloroethylene, carbon tetrachloride, and solent naphthas, are obtained.

The present invention provides novel thermoplastic, thermosettable, and/or thermosetting copolymers which combine the qualities of efficiency, economy and being comparatively inert in ecological effects. Even when present at comparatively low levels in the copolymer, the amide-glyoxal system provides highly efficient cures such as cures familiar to those skilled in the art, obtainable by means of formaldehyde or formaldehyde condensate systems. The products produced have laundering resistance and dry cleaning resistance typical of the formaldehyde-containing systems as can be determined by testing the bonded or treated fabric or paper for durability in the presence of water or in laundering and in dry cleaning tests. The aqueous latexes of the present invention are sufficiently stable to pose no problems to the formulator or manufacturer using and applying these systems.

The bonded fibrous products of the present invention are characterized by softness, flexibility, resistance to discoloration on exposure to ultraviolet light, resistance to chlorinated hydrocarbon dry-cleaning fluids, and resistance to laundering. Because of the softness and flexibility and good draping qualities of the products of the present invention, they are particularly well adapted for use in garments where porosity, permeability to moisture vapor, and soft hand and feel, make the products advantageous where contact with the skin of a wearer may be involved. In general, the products are quite stable dimensionally and have good resilience and shape-retention properties. They are adapted for use not only in garments but as padding or cushioning, and moisture-absorbing articles, such as bibs and diapers. They are also useful as heat- and sound-insulating materials and as filtration media, both for liquids and gases. They can be laminated with paper, textile fabrics, or leather to modify one or both surfaces of the latter materials. They may be adhered to films of cellophane, polyethylene, saran, polyethyhlene glycol terephthalate (Mylar) or metallic foils, such as of aluminum, to improve the tear strength of such films and foils, to make the latter more amenable to stitching, and to modify other characteristics including strength, toughness, stiffness, appearance, and handle.

Of particular advantage in the products of this invention is the absence of traces of formaldehyde. This means that wearers of the fabrics produced or workers who must come in close contact with the fabrics or other materials employing these polymers do not experience irritation due to dermal contact or inhalation of formaldehyde as occured with formaldehyde-containing materials of the prior art. Of particular importance is the elimination of formaldehyde, a known irritant to sensitive skin, from articles such as bibs and diapers. This is in addition to the enhanced working conditions, with respect to the formaldehyde-containing polymers of the prior art, due to the absence of formaldehyde in the plants and workrooms of the fabricators.

While the binder may be preferentially applied, if desired, to portions of the fibrous product, such as one or both of the faces or parts thereof, it is characteristic of the binder of the present invention that, if such preferential treatment is not desired, substantially uniform distribution may be obtained because of the reduced tendency of the binder after initial distribution throughout the body of the fibrous product to migrate to the surfaces thereof during drying.

In the examples and elsewhere herein, parts and percentages are by weight and temperatures in °C. unless otherwise indicated. The following examples are illustrations designed to assist those skilled in the art to practice the present invention but are not intended to limit the invention in any way. The monomers and other chemicals used in the examples are commercial grade materials. Changes and variations may be made without departing from the spirit and scope of the invention as defined by the appended claims.

Example 1. Ethyl Acrylate Based Latex

In a kettle equipped with condenser, stirrer, thermometer and facilities for monomer emulsion feed, heating, cooling and nitrogen sparging, 850 g. of water is heated to ca. 83° C. under nitrogen sparge. To this are added 70 g. of a 40% glyoxal (GL) solution, 4 g. of ammonium persulfate and 100 g. of a monomer emulsion of composition:

800 g. water
87 g. 23% aqueous sodium dodecyl benzene sulfonate
80 g. acrylamide (AM)
20 g. itaconic acid (IA)
1872 g. ethyl acrylate (EA)

maintaining the nitrogen sparge and with suitable agitation. After 10 minutes, the remaining monomer emulsion is added uniformly over a 2-hour period along with an initiator cofeed of composition:

4 g. sodium persulfate
120 g. water

During this period, the temperature is maintained at ca. 83° C. Fifteen minutes after the addition, the batch is cooled to 55° C. and chased with:

|  |  |  |
|---|---|---|
| premixed: | 1 | g. 1% FeSO$_4$ . 7H$_2$O in water |
|  | 2 | g. t-butyl hydroperoxide |
|  | 0.1 | g. 23% sodium dodecylbenzene sulfonate in water |
|  | 10 | g. water |
| premixed: | 1.2 | g. sodium metabisulfite, Na$_2$S$_2$O$_5$ |
|  | 2.4 | g. glyoxal |
|  | 18 | g. water |

The same chaser charge is added after thirty minutes and again after sixty minutes. Fifteen or more minutes after the last chaser 50 g. of 35% aqueous hydrogen peroxide is added. The resulting copolymer has the composition EA/AM/IA/GL=93.5/4/1/1.5.

Example 2. Latex Based on Ethyl-Butyl Acrylates and Acrylonitrile

The polymerization procedure is the same as Example 1 except that the composition of the monomer emulsion is:

800 g. water
87 g. 23% aqueous dodecyl benzene sulfonate
70 g. acrylamide
30 g. itaconic acid
90 g. acrylonitrile (AN)
502 g. n-butyl acrylate (BA)
1280 g. ethyl acrylate The resulting polymer has the composition EA/BA/AN/AM/IA/GL=64/25/4.5/3.5/1.5/1.5.

Example 3. Acid-free Ethyl Acrylate Based latex

The polymerization procedure is the same as Example 1 except that 80 g. of a 40% glyoxal solution is in the kettle and the composition of the monomer emulsion is:

800 g. water
87 g. 23% aqueous dodecyl benzene sulfonate
80 g. acrylamide
1880 g. ethyl acrylate The resulting polymer has the composition EA/AM/GL=94.5/4/1.5.

Example 4. Nonwoven Fabric

The polymers of Examples 1, 2 and 3 and that of a typical acrylate latex based on methylolated acrylamide crosslinking are padded onto a light weight (0.5 oz./yd.$^2$) rayon nonwoven web to give a fiber/binder ratio of 80/20. The methylolated acrylamide polymer is catalyzed with 0.5% ammonium nitrate in the bath but the glyoxal polymers are uncatalyzed. The webs are air dried and then cured for two minutes at 150° C. Tensile values are measured on 1 in. ×4 in. strips in the cross-machine direction (XMD) using an Instron Tester at an extension rate of 12 in./minute with a jaw separation of 2 in. Wet samples (water, perchloroethylene (PCE) and isopropanol (IPA)) are soaked for a minimum of 30 minutes. The values reported represent maximum force before break. Samples measuring 12 by 12 in. are washed in an automatic washer at 135°±5° F. with ¼ cup of Tide TM detergent and 8 terry-cloth towels as ballast. Failure to survive is measured by the tearing of a sample into two or more pieces. Typical results are:

| Binder | Washes Survived | XMD Tensile Strength (oz./in.) | | | |
|---|---|---|---|---|---|
|  |  | Dry | Water Wet | PCE Wet | IPA Wet |
| See Note 1 | 14 | 25 | 11 | 14 | 14 |
| Example 1 | 10 | 24 | 10 | 13 | 11 |
| Example 2 | 14 | 32 | 13 | 17 | 13 |
| Example 3 | 8 | 22 | 11 | 13 | 13 |

Note 1:
The typical latex employing the formaldehyde chemistry is polymerized by a redox procedure. It is prepared at 45% polymer in water and from the following monomers: 1.7% acrylamide, 2.4% N-methylolacrylamide and 95.9% ethyl acrylate.

Examples 5, 6 and 7. Redox vs. Thermal Polymerization and High Glyoxal Level The physical properties of a nonwoven rayon bonded with the various latexes is given in the following table. In the preparation of the redox later (Example 5), a process similar to that of Example 1 is used except that the initiator consists of ammonium persulfate and sodium bisulfite with a trace of a ferrous salt and the temperature is about 65° C. The latices of Examples 6 and 7 are prepared by the process of Example 1.

TABLE I

| Sample[a] | Composition | AM/GL[b] | Process | Washes Survived | XMD Tensile Strength (oz./in.) | | | |
|---|---|---|---|---|---|---|---|---|
|  |  |  |  |  | Dry | Wet Water | PCE | IPA |
| Example 5 | 96EA/2.8AM/1.2GL | 2 | Redox | 6 | 21 | 9.6 | 8.0 | 6.4 |
| Example 6 | 96EA/2.8AM/1.2GL | 2 | Thermal | 6 | 26 | 9.6 | 9.6 | 9.6 |
| Example 7 | 94EA/3.3AM/2.7GL | 2 | Thermal | 6 | 26 | 9.6 | 13 | 13 |

[a]Applied at 15% polymer bath solids with 0.5% NH$_4$NO$_3$ catalyst. Webs were air-dried and cured at 300° F./2 min.
[b]Molar ratio indicated.

These data show that the polymer polymerized by the thermal process gives a higher dry tensile strength and higher tensile strength in solvents than that polymerized by the redox process. It is also seen that the only advantage of the higher glyoxal to acrylamide ratio, at the higher acrylamide level, is in greater tensile strength in the solvent systems.

Examples 8–11. Effect of Acrylamide to Glyoxal Ratio

Polymers made by the thermal process as in Example 1, in which the acrylamide level was 4 weight percent and the glyoxal level was varied, as indicated in the table below, were used to bond nonwoven rayon webs. The bonded webs were tested as in Example 4 with the results given in the table below.

TABLE II

| Sample[a] | Composition | AM/GL[b] | Wash Cycles | XMD Tensile Strength (oz./in.) | | | |
|---|---|---|---|---|---|---|---|
| | | | | Dry | Wet Water | PCE | IPA |
| Ex. 8 | 95.2EA/4AM/0.8GL | 4.0 | 9 | 22 | 9.2 | 13 | 10 |
| Ex. 9 | 94.8EA/4AM/1.2GL | 2.7 | 9 | 22 | 10 | 12 | 10 |
| Ex. 10 | 94.4EA/4AM/1.6GL | 2.0 | 8 | 22 | 11 | 13 | 13 |
| Ex. 11 | 93.6EA/4AM/2.4GL | 1.3 | 3 | 20 | 10 | 13 | 13 |

[a]Applied at 15% polymer bath solids with 0.5% $NH_4NO_3$ catalyst. Webs were air-dried and cured at 300° F./2 min.
[b]Molar ratio indicated.

The web bonded with the polymer containing the highest glyoxal level, Example 11, has less wash durability than the others.

Examples 12–16. Effect of Varying Acrylamide Level

Using the thermal process, as in Example 1, polymers were prepared in which the acrylamide to glyoxal molar ratio was held at 3 and the acrylamide level was varied as given in the following table. Bonded webs were prepared and tested as in Example 4, with the results given in the following table.

TABLE III

| Sample | Composition | Wash Cycles | XMD Tensile Strength (oz./in.) | | | |
|---|---|---|---|---|---|---|
| | | | Dry | Wet Water | PCE | IPA |
| Ex. 12 | 97.46EA/2.0AM/0.54GL | 8 | 22 | 9.2 | 13 | 8.4 |
| Ex. 13 | 96.19EA/3.0AM/0.81GL | 7 | 22 | 9.2 | 11 | 9.2 |
| Ex. 14 | 94.92EA/4.0AM/1.08GL | 7 | 24 | 9.2 | 10 | 11 |
| Ex. 15 | 93.65EA/5.0AM/1.35GL | 6 | 24 | 8.8 | 12 | 11 |
| Ex. 16 | 92.38EA/6.0AM/1.62GL | 6 | 24 | 9.6 | 12 | 12 |

[a]Applied at 15% polymer bath solids with 0.5% $NH_4NO_3$ catalyst. Webs were air-dried and cured at 300° F./2 min.

Examples 17–22. Polymers Containing Itaconic Acid

Using the procedure of Example 1, polymers were made incorporating itaconic acid at three levels and acrylamide at two levels also utilizing two values of the acrylamide glyoxal ratio. One polymer was also made by a redox polymerization process. The preparation of the bonded webs and the testing was as in Example 4 with the results being given in the table below.

TABLE IV

| Sample[a] | Composition | AM/GL[b] | Washes Survived | XMD Tensile Strength (oz./in.) | | | |
|---|---|---|---|---|---|---|---|
| | | | | Dry | Wet Water | PCE | IPA |
| Ex. 17 | 93.4EA/4.0AM/1.6GL/1.0IA | 2 | 10 | 24 | 10 | 13 | 11 |
| Ex. 18[c] | 93.4EA/4.0AM/1.6GL/1.0IA | 2 | 7 | 22 | 8.0 | 13 | 9.6 |
| Ex. 19 | 93.92EA/4.0AM/1.08GL/1.0IA | 3 | 7 | 25 | 9.6 | 10 | 8.4 |
| Ex. 20 | 93.15EA/5.0AM/1.35GL/0.5IA | 3 | 7 | 26 | 8.8 | 13 | 10 |
| Ex. 21 | 92.65EA/5.0AM/1.35GL/1.0IA | 3 | 6 | 26 | 9.6 | 14 | 10 |
| Ex. 22 | 92.15EA/5.0AM/1.35GL/1.5IA | 3 | 7 | 25 | 9.6 | 13 | 11 |

[a]Applied at 15% polymer bath solids with 0.5% $NH_4NO_3$ catalyst. Webs were air-dried and cured at 300° F./2 min.
[b]Molar ratio indicated.
[c]Prepared by a one-shot redox polymerization process differing from the preparation of Example 5 as follows: All of the monomers are incorporated in the kettle charge at 35% (total monomers) in water. Initiation is at 20° C.

Examples 23–25. Experiments with Post Added Glyoxal

A polymer of the composition of Example 2, omitting the glyoxal, is prepared by the process of Example 5, and divided into three aliquots. In Example 23, the aliquot is used as is; in Example 24, glyoxal is post added at the level of ½ mole per mole of acrylamide; and in Example 25, glyoxal is post added at the same level in addition to which the latex is heat aged at 140° F. for 70 hours. Each aliquot is then used to bond a nonwoven rayon web and tested by the procedure outlined in Example 4.

The heat age sample was heat aged before the addition of the ammonium nitrate catalyst. The results show that post addition of glyoxal has comparatively little effect on the properties of the bonded fiber, however, heat aging after post adding the glyoxal does produce a marked improvement in the properties of the bonded fiber although not to the level achieved with the co-reacted glyoxal in Example 2. It is recognized that in all three of these examples, there may have been a limited amount of crosslinking by mechanisms not involving the amide or the glyoxal.

It is to be understood that changes and variations may be made without departing from the spirit and scope of this invention which is defined by the appended claims.

We claim:

1. A process for making a fabric or paper which comprises treating a textile or paper substrate with (1) a water-insoluble addition copolymer of (A) a monomer which is the product of an ethylenically unsaturated unsubstituted amide monomer condensed with one aldehyde group of a polyaldehyde, the product having at least one free aldehyde group, and (B) at least one other ethylenically unsaturated monomer; the amide monomer component of (A) and any unsubstituted amide monomer of (B) totaling up to 50% of the total monomers, by weight, and, optionally, (2) an external crosslinker and curing the treated substrate at an elevated temperature.

2. The process of claim 1 wherein the copolymer is thermosettable and wherein (B) comprises an ethylenically unsaturated unsubstituted amide monomer.

3. The process of claim 2 wherein the copolymer is in a copolymer latex.

4. The process of claim 3 wherein the polyaldehyde is glyoxal.

5. The process of claim 4 in which substantially all of the glyoxal in the latex is bonded to the copolymer.

6. The process of claim 5, the copolymer having about 0.2 to about 0.8 of a mole of glyoxal per mole of amide groups.

7. The process of claim 6 in which the amide monomers of (A) and (B) total about 0.5% to about 12% of the monomers, by weight.

8. The process of claim 7 in which the amide monomers total about 3% to 6%, by weight, and having about 0.4 to about 0.6 mole of glyoxal per mole of amide groups.

9. The process of claim 8 in which the amide monomers of (A) and (B) are acrylamide, methacrylamide or a mixture thereof.

10. The process of claim 9, the copolymer being a copolymer of an ethylenically unsaturated carboxylic acid.

11. The process of claim 10 the copolymer having a glass transition temperature below about 35° C.

12. The process of claim 11, the copolymer being a copolymer of at least about 60% by weight of esters of acrylic or methacrylic acid.

13. The process of claim 3 the copolymer being a copolymer of, by weight, 20 to 96% ethyl acrylate, 0 to 96% propyl or butyl acrylate or a mixture thereof, 0 to 25% acrylonitrile, 0 to 50% methyl methacrylate, 3 to 6% acrylamide, 0 to 2% itaconic acid and 1 to 2% glyoxal.

14. The process of claim 13, the copolymer being a copolymer of 70 to 92.5% ethyl acrylate, 3 to 5% acrylonitrile, 0 to 25% butyl acrylate, 0 to 10% methyl methacrylate, 3 to 4% acrylamide, 0.5 to 1.5% itaconic acid and 1 to 2% glyoxal, by weight.

15. The process of claim 1 wherein the external crosslinker is an aminoplast up to 25% of the copolymer by weight.

16. The process of claim 15 wherein the aminoplast is urea or melamine and the amount is up to 7% of the copolymer by weight.

17. The process of claim 16 the copolymer having 0.5 to 1.0 moles of polyaldehyde per amide group.

18. A treated paper made by the process of claim 1.

19. A treated fabric made by the process of claim 1.

* * * * *